United States Patent
Wall

(10) Patent No.: US 11,440,406 B2
(45) Date of Patent: Sep. 13, 2022

(54) METHOD FOR DISPLAYING INFORMATION FOR A USER OF A VEHICLE

(71) Applicant: AUDI AG, Ingolstadt (DE)

(72) Inventor: Christian Wall, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 614 days.

(21) Appl. No.: 16/479,350

(22) PCT Filed: Jan. 18, 2018

(86) PCT No.: PCT/EP2018/051181
§ 371 (c)(1),
(2) Date: Jul. 19, 2019

(87) PCT Pub. No.: WO2018/149584
PCT Pub. Date: Aug. 23, 2018

(65) Prior Publication Data
US 2019/0351767 A1    Nov. 21, 2019

(30) Foreign Application Priority Data

Feb. 16, 2017  (DE) ...................... 10 2017 202 483.6

(51) Int. Cl.
*B60K 35/00*  (2006.01)
*G06K 9/00*  (2022.01)
(Continued)

(52) U.S. Cl.
CPC .......... *B60K 35/00* (2013.01); *G02B 27/0179* (2013.01); *G06V 20/59* (2022.01);
(Continued)

(58) Field of Classification Search
CPC ............................ B60K 35/00; B60K 2370/52
See application file for complete search history.

(56) References Cited

U.S. PATENT DOCUMENTS

| 2005/0154505 A1* | 7/2005 | Nakamura ............. G02B 27/01 701/1 |
| 2014/0168608 A1 | 6/2014 | Disley |

(Continued)

FOREIGN PATENT DOCUMENTS

| CN | 1629930 A | 6/2005 |
| CN | 103873843 A | 6/2014 |

(Continued)

OTHER PUBLICATIONS

Chinese Office Action dated Jun. 10, 2021, in connection with corresponding CN Application No. 201880011813.7 (12 pp., including machine-generated English translation).

(Continued)

*Primary Examiner* — Nan-Ying Yang
(74) *Attorney, Agent, or Firm* — Maier & Maier, PLLC

(57) ABSTRACT

A method for displaying information for a user of a vehicle by means of a projection system, which has a projection unit, a control device, a first projection field, and at least one second projection field, wherein the information is transferred from the control device to the projection unit, and wherein the projection system is switched over from a first beam path, in the case of which light beams produced by the projection unit are directed onto the first projection field, to a second beam path, in the case of which light beams produced by the projection unit are directed onto the at least one second projection field, in accordance with the current position of a seat of the user, the light beams produced by the projection unit being deflected to a field of view of the user by the at least one second projection field.

9 Claims, 1 Drawing Sheet

(51) Int. Cl.
*G02B 27/01* (2006.01)
*G06V 20/59* (2022.01)

(52) U.S. Cl.
CPC .... *B60K 2370/334* (2019.05); *B60K 2370/66* (2019.05); *G02B 2027/0181* (2013.01)

(56) References Cited

U.S. PATENT DOCUMENTS

2015/0344032 A1* 12/2015 Oh ........................ B62D 6/00
                                                      348/46
2018/0029501 A1*  2/2018 Wolf ................... B60R 16/0232

FOREIGN PATENT DOCUMENTS

| DE | 69312047 T2 | 10/1997 |
|---|---|---|
| DE | 102007015877 A1 | 10/2008 |
| DE | 102007035505 A1 | 1/2009 |
| DE | 102009028498 A1 | 2/2011 |
| DE | 102014013221 A1 | 4/2015 |
| DE | 102014216661 A1 | 2/2016 |
| DE | 102015206501 A1 | 10/2016 |
| JP | 2016176962 A | 10/2016 |
| WO | 9828649 A1 | 7/1998 |

OTHER PUBLICATIONS

Chinese Office Action dated Dec. 23, 2020, in connection with corresponding CN Application No. 201880011813.7 (22 pp., including machine-generated English translation).
German Examination Report dated May 6, 2019 in corresponding German Application No. 10 2018 215 134.2; 16 pages.
International Search Report and Written Opinion dated Jun. 1, 2018 in corresponding International Application No. PCT/EP2018/051181; 17 pgs.
German Examination Report dated Feb. 11, 2022 in corresponding German Patent Application No. 102017202483.6 (6 pages with English Translation).
English-language translation of International Preliminary Report on Patentability dated Aug. 29, 2019 in corresponding International Application No. PCT/EP2018/051181; 9 pages.
German Examination Report dated Nov. 16, 2021 in corresponding German Application No. 10 2017 202 483.6; 18 pages.

* cited by examiner

METHOD FOR DISPLAYING INFORMATION FOR A USER OF A VEHICLE

FIELD

The present invention relates to a method for displaying information for a user of a vehicle by means of a projection system, and to a projection system and a vehicle.

BACKGROUND

For displaying information, such as, e. g., navigation instructions, so-called "head-up displays" are often used, which are based on information being projected by means of a projection unit onto a projection field. In a vehicle, a projection field is usually located on a windshield of the vehicle, so that a driver who has assumed a seating position for manually steering the vehicle can recognize the information displayed on the projection field.

For example, if a driver changes from an upright seating position, such as is required for manual steering of the vehicle, e. g., into a horizontal comfort position due to an activation of an autonomous driving mode of a vehicle, it is possible that the driver can no longer recognize information displayed on a projection field, which is provided on a windshield of the vehicle, because a field of view of the driver moves from the windshield to a roof liner of the vehicle as a result of the horizontal comfort position.

German publication DE 10 2009 028 498 A1 discloses a projection display device for vehicles in which a position of image information is adapted to a changed seating position.

German publication DE 10 2007 015 877 A1 discloses a method for depicting information using a display device, in which a virtual image is positioned on a windshield as a function of a detected seating position.

A method for operating multimedia contents in a means of transport is disclosed in the German publication DE 10 2014 216 661 A1.

SUMMARY

Against this background, it is an object of the present invention to provide an option for viewing information to be displayed by means of a projection unit, both in a seating position for manually steering a vehicle and in a comfort seating position in which a driver of the vehicle is essentially horizontal.

To achieve the above object, a method for displaying information for a user of a vehicle by means of a projection system, comprising a projection unit, a control device, a first projection field, and at least one second projection field, is introduced, wherein the information is transferred from the control device to the projection unit, and wherein the projection system is switched from a first beam path, in the case of which light beams produced by the projection unit are directed onto the first projection field, to a second beam path, in the case of which light beams produced by the projection unit are directed onto the at least one second projection field, as a function of a current position of a seat of the user, the light beams produced by the projection unit being deflected to a field of view of the user by means of the at least one second projection field.

Embodiments of the present invention will become apparent from the description and the dependent claims.

The presented method is used in particular for displaying information for a driver in different seating positions. For this purpose, it is provided that the information is displayed by means of a projection system comprising a projection unit, a control unit, a first projection field and at least one second projection field. So as to visibly display the information both in one seating position and in a second seating position to the driver, it is provided that the projection system is switched from a first beam path, in the case of which light beams produced by the projection unit are directed onto the first projection field, to a second beam path, in the case of which light beams produced by the projection unit are directed onto the at least one second projection field, as a function of a current position of a seat of the user. This means that, depending on the current seating position, a projection field suitable for displaying the information is selected, and a beam path of the projection system is adapted or switched so that light beams produced by the projection unit fall into a field of view of the driver.

In the context of the presented invention, a projection field is understood to mean a surface by means of which light beams produced by a projection unit can be reflected and, by virtue thereof, deflected. A projection field can be a projection surface on which information is displayed to a user. For this purpose, it is provided, in particular, for a projection field to be oriented such that light beams reflected by the projection field can be recognized in a field of view of a user. In an embodiment of the presented method, it is conceivable that respective light beams produced by a projection unit are reflected across a plurality of projection fields to a user, i. e., into a field of view of a user, for example, in accordance with a second beam path.

It is provided that respective information to be displayed is read out from a control device of the projection system from, for example, a memory and transferred to the projection unit. The projection unit converts the information transferred by the control unit into pixels and projects them, depending on the currently set beam path, onto the first projection field or onto the second projection field.

In order to visibly display respective information to be displayed to a driver, it is provided that the first projection field and the at least one second projection field have an at least partially reflective surface, so that the driver can observe the information to be displayed when viewing the first projection field or the at least one second projection field.

In the context of the present invention, a field of view of a user is understood to mean an area that a user can see in his or her current position in a relaxed posture, i. e., without actively moving his or her head. A field of view surrounds a user's axis of view so that a projection field that intersects a user's axis of view or is located on a user's axis of view is typically located within a user's field of view. It is also conceivable for a projection field to reflect light beams impinging on the projection field into the field of view of the user.

In the context of the present invention, a beam path is understood to mean a path along which light beams produced by a projection unit pass. A beam path can, for example, be predefined by projection fields, which are designed, in particular, as mirrors and are suitable for deflecting light beams on their way. In order to switch from a first beam path, i. e., a first path along which light beams are guided, to a second beam path, i. e., a second path along which light beams are guided, in the projection unit itself a geometry of a space through which the light beams are guided, or a position of the projection unit or a position of respective objects on which the light beams impinge, can be changed. In particular, it is provided that an angle at which a projection field onto which the light beams impinge is oriented with a respective structure carrying the projection field, such as, for example, a roof liner, is changed in order to switch between a first beam path and a second beam path. For this purpose, it can be provided, in particular, that the second projection field provided according to the invention is moved in order to reflect or radiate the light beams at an angle which causes the light beams to impinge on a field of view of a user.

In a possible embodiment of the presented method it is provided that, if the projection system is switched over from the first beam path to the second beam path, an orientation of the projection unit towards the at least one second projection field is changed as a function of the current position of the seat until the light beams produced by the projection unit hit the field of view of the user.

In order to direct light beams produced by a projection unit into a field of view of a user, when said user has been moved, for example, from a first sitting position to a second sitting position, it can be provided that at least one second projection field additionally to a currently used first projection field is illuminated. By a second projection field, which is, for example, arranged on a roof liner, light beams directed at the additional projection field can be deflected or reflected to areas that are outside of an area into which light beams emitted by the projection unit by means of a first projection field, which is arranged, for example, on a windshield, can be deflected. Accordingly, optionally different areas can be supplied or illuminated with light beams from the projection unit by means of various projection fields.

In a further possible embodiment of the presented method, it is provided that an orientation of the at least one second projection field towards the seat is changed until the light beams produced by the projection unit hit the field of view of the user.

For exactly orientating a projection field towards a field of view of a user, it is provided that the at least one second projection field or a surface forming the at least one second projection field is moved relative to the user or a seat of the user. To determine a position of the field of view of the user and to orientate a respective projection field or a respective projection unit accordingly, it may be provided that a predetermined point at the seat of the user is assigned to a center of the field of view of the user. For this purpose, it can be provided in particular that the predetermined point on the seat is selected as function of a height of the user which can be provided, for example, before using the projection system. Since the position of the point on the seat is always known when the seat moves through a coordinate system in which the seat moves, the projection field and/or the projection unit can be precisely orientated towards the position or coordinate at which the point at the seat is currently located.

Of course, it is also conceivable that the position of the field of view of the user is detected by means of at least one sensor, such as, e. g., a camera and calculated using an image processing program. In doing so, a continuous update of the position of the field of view can take place, whereby the projection field can be continuously orientated to accommodate a movement of the user.

In a further possible embodiment of the presented method, it is provided that, in the event that the user activates a calibration mode, an orientation of the projection unit and/or the at least one second projection field towards the user is changed until the user ends the calibration mode.

In order to orientate a beam path towards a user according to individual preferences of the user, it may be provided that the user calibrates the beam path by moving respective objects provided in the beam path such as, e. g., several projection fields or several surfaces with a projection field, or a geometry of a space through which light beams produced by a projection unit are passed through, is changed. In such a calibration process can, for example, a so-called "offset value" be determined which indicates a user-related deviation from a standard value and which will be taken into account when setting a beam path in the future.

In a further possible embodiment of the presented method it is provided that the projection system is switched over from the first beam path to the second beam path when the seat has been moved to a comfortable position in which a field of view of the user has been or is moved from a first area of the vehicle, such as, e. g., a windshield, to a second area of the vehicle, such as, e. g., a roof liner.

To ensure, for example, when switching over a seating position from a driving position in which a driver is oriented substantially vertically with respect to a chassis of a respective vehicle to a comfortable position in which the driver is oriented substantially horizontally with respect to the chassis of the vehicle, a display of information in a field of view of the driver, it is provided that the switching operation provided according to the invention, wherein a first beam path is changed to a second beam path, then takes place when the user has changed or changes between the driving position and the comfort position. For this purpose, the switching over operation, wherein the first beam path is changed to the second beam path, can take place as a function of a control command to change from the driving position to the comfortable position, or vice versa.

Alternatively, it can be provided that the switching over operation, wherein the first beam path is changed to the second beam path, then takes place when the seat reaches a predetermined coordinate in a coordinate system of the vehicle, or moves across this coordinate. Of course, a switching over operation from the second beam path to the first beam path can take place when the seat is moved in opposite directions.

Furthermore, the present invention relates to a projection system for displaying information in a vehicle comprising a projection unit, a control device, a first projection field, and at least a second projection field, the projection system being configured, as a function of a current position of a seat of a user of the vehicle, to switch over from of a first beam path, in which light beams produced by the projection unit are directed to the first projection field, to a second beam path, in which light beams produced by the projection unit are directed to the at least one second projection field, the at least second projection field being configured to reflect the light beams produced by the projection unit to a field of view of the user in a second sitting position, and the first projection field being configured to reflect the light beams produced by the projection unit to a field of view of the user in a first sitting position.

The presented projection system is used in particular for carrying out the presented method.

In one possible embodiment of the presented projection system, it is provided that the at least one second projection field is configured to reflect the light beams produced by the projection unit to the field of view of the user, if an autonomous driving operation of the vehicle has been activated.

The presented projection system is used, in particular, for displaying information in a field of view of a driver of a vehicle when he changes his seat position from a driving position in a manual driving operation to a comfort position in an autonomous driving operation. For this purpose, it may be provided that a control command for switching over the vehicle from the manual driving operation to the autonomous driving operation is transferred to a control device of the projection system, and the control device configures the projection system for the autonomous driving operation. For this purpose, the control device switches over from a first beam path to a second beam path, whereby a different projection field is illuminated compared to the manual driving operation and light beams produced by a projection unit of the projection system are deflected to a field of view of the driver in the comfortable position. Of course, the control device is configured to configure the projection system with a corresponding movement in the opposite direction of the seat or when switching over from the autonomous driving operation to the manual driving operation accordingly optimized for manual driving, and to switch over from the second beam path to the first beam path.

Furthermore, the present invention relates to a vehicle with a projection system comprising a first projection field and at least a second projection field and a projection unit, wherein the at least one second projection field is arranged on a device or a combination of devices of the following list of devices of the vehicle: roof liner, support, windshield or sun shield.

The presented method is used in particular for the operation of the presented vehicle.

Further advantages and embodiments will become apparent from the description and the accompanying drawings.

It is understood that the features mentioned above and those yet to be explained can be used not only in the respective specified combination, but also in other combinations or alone, without departing from the scope of the present invention.

BRIEF DESCRIPTION OF THE DRAWINGS

The invention is schematically illustrated by means of embodiments in the drawings and will be described schematically and in detail with reference to the drawings.

The figures are described coherently and comprehensively. Like features are identified by like reference numerals.

DETAILED DESCRIPTION

Figure 1:
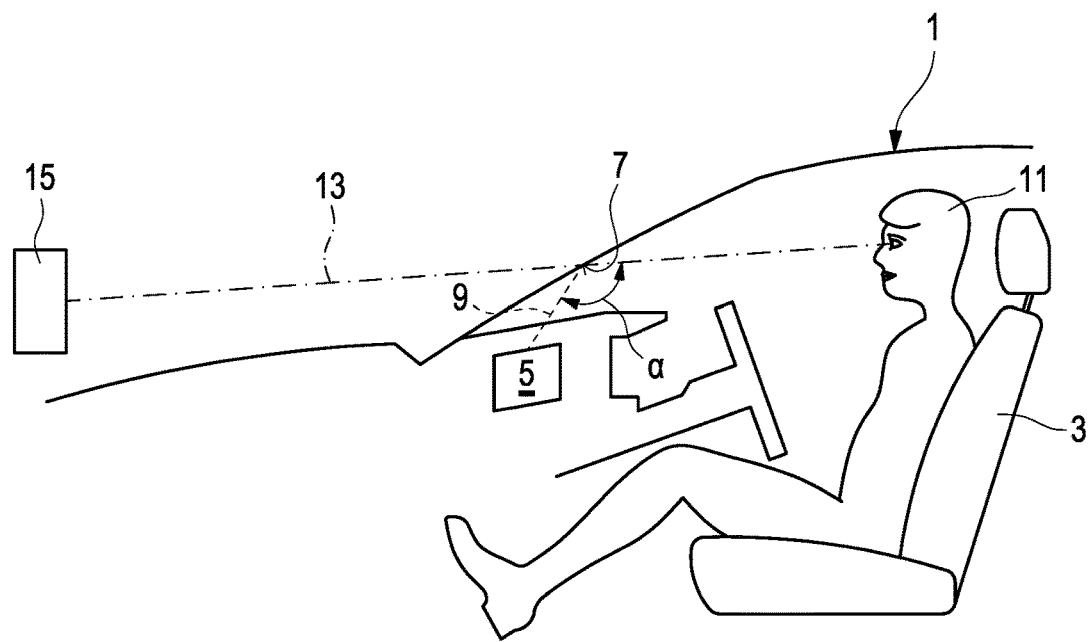
FIG. 1 shows a schematic representation of a possible embodiment of the projection system according to the invention in a driving position.

FIG. 1 shows a vehicle 1 with a seat 3 and a projection unit 5. Projection unit 5 generates an image and projects said image onto a first projection field 7. For this purpose, projection unit 5 generates light beams and projects said light beams via a first beam path 9 onto first projection field 7. The light rays are reflected from the first projection field 7 at least partially at an angle α between a first axis of view 13 of a driver 11 and the first beam path 9, so that the light beams produced by projection unit 5 are at least partially in a field of view of driver 11 and can be recognized by driver 11. Accordingly, information displayed on first projection field 7 and environmental features located in a driver's field of view combine to form an overall image 15 which is ultimately perceived by driver 11. In the present case, the field of view, which of course extends spatially, is indicated by the axis of view 13, which runs centrally through the field of view of driver 11. Accordingly, projection field 7, which is intersected by the axis of view 13, is in the field of view of driver 11.

Figure 2:
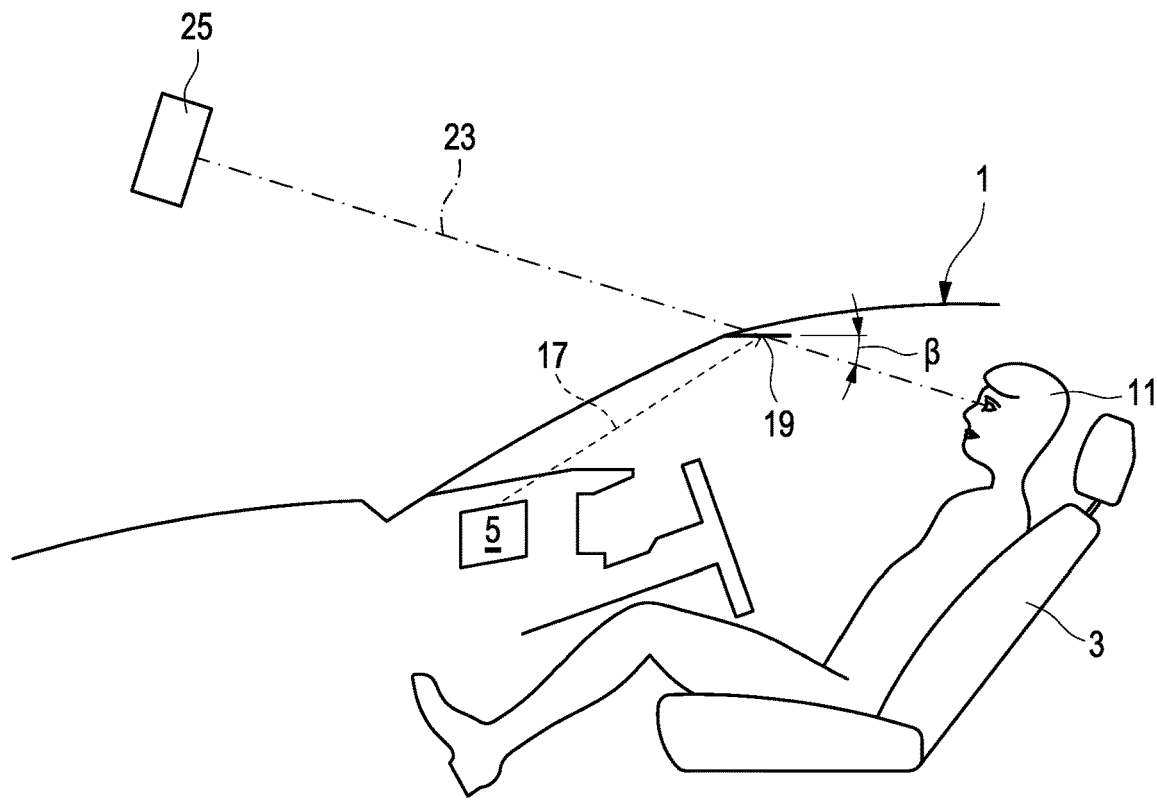
FIG. 2 shows a schematic representation of the projection system of FIG. 1 in a comfortable position.

In FIG. 2, seat 3 is shown in a comfortable position, in which seat 3 has been moved after vehicle 1 has been switched over from a manual driving operation, as shown in FIG. 1, to an automatic or autonomous driving operation.

In the comfortable position, seat 3 is tilted further compared to the position for the manual driving operation, so that the driver 11 is oriented significantly further horizontally with respect to a chassis of vehicle 1 as compared with the position for the manual driving operation. Correspondingly, the first axis of view 13 together with a field of view of driver 11 has been shifted to a second axis of view 23 compared to the position shown in FIG. 1.

In order to continue to project the information to be displayed by projection unit 5 into the field of view of the driver 11, projection unit 5 is switched over, so that light beams produced by projection unit 5 are no longer radiated on first projection field 7 in a second beam path 17, but on a second projection field 19. The second projection field 19 is arranged at an angle β to the second axis of view 23 of driver 11, so that the second projection field 19 reflects at least partially the light beams incident through the second beam path 17 into a field of view of driver 11. Accordingly, respective light beams transferred through the second beam path 17 and redirected by means of the second projection field 19 form together with the surroundings in the field of view of driver 11 an overall image 25, which is perceived by driver 11.

The invention claimed is:

1. A method for displaying information for a user of a vehicle by a projection system, comprising:
arranging a first projection field on a windshield of the vehicle,
arranging at least one second projection field on a roof liner of the vehicle, separate from the windshield,
transferring information from a control device of the vehicle to a projection unit, and
switching the projection system between a first beam path and a second beam path based on an orientation of the user of the vehicle,
wherein the first beam path directs light beams produced by the projection unit to the first projection field, the projection system switching to the first beam path when a seat of the user is in a driving position whereby the user is oriented substantially vertically with respect to a chassis of the vehicle, and
wherein the second beam path directs the light beams produced by the projection unit to the at least one second projection field, the projection system switching to the second beam path when the seat of the user is in a comfort position whereby the user is oriented substantially horizontally with respect to the chassis of the vehicle.

2. The method according to claim 1, wherein switching the projection system between the first and second beam paths comprises:
adjusting, as a function of a current position of the seat, an orientation of the projection unit with respect to the first or the at least one second projection fields so that the light beams produced by the projection unit meet a field of view of the user.

3. The method according to claim 1, further comprising:
adjusting, as a function of a current position of the seat, an orientation of the at least one second projection field so that the light beams produced by the projection unit meet a field of view of the user.

4. The method according to claim 1, wherein, when the user activates a calibration mode, an orientation of the projection unit and of the at least one second projection field with respect to the user are changed until the user ends the calibration mode.

5. The method according to claim 1, wherein the projection system is switched from the first beam path to the second beam path when an autonomous driving mode of the vehicle has been activated.

6. A projection system for displaying information in a vehicle, comprising:
a projection unit,
a control device,
a first projection field arranged on a windshield of the vehicle, and
at least one second projection field arranged on a roof liner of the vehicle, separate from the windshield,
wherein the projection system is configured to be switched between a first beam path and a second beam path based on an orientation of the user of the vehicle,
wherein the first beam path directs light beams produced by the projection unit to the first projection field, the projection system switching to the first beam path when a seat of the user is in a driving position whereby the user is oriented substantially vertically with respect to a chassis of the vehicle, and
wherein the second beam path directs the light beams produced by the projection unit to the at least one second projection field, the projection system switching to the second beam path when the seat of the user is in a comfort position whereby the user is oriented substantially horizontally with respect to the chassis of the vehicle.

7. The projection system according to claim 6, wherein the projection system switches from the first beam path to the second beam path when an autonomous driving mode of the vehicle is activated.

8. The projection system according to claim 6, wherein an orientation of the projection unit is adjustable, as a function of a current position of the seat, with respect to the first or the at least one second projection fields so that the light beams produced by the projection unit meet a field of view of the user.

9. The projection system according to claim 6, wherein an orientation of the at least one second projection field is adjustable, as a function of a current position of the seat, so that the light beams produced by the projection unit meet a field of view of the user.

* * * * *